United States Patent [19]

Janc et al.

[11] 4,370,748

[45] Jan. 25, 1983

[54] APPARATUS AND METHOD FOR DETECTING THE PRESENCE OF A PULSED RADIO FREQUENCY SIGNAL

[75] Inventors: Robert V. Janc, Palos Heights; David S. Robins, Buffalo Grove; Michael H. Retzer, Schaumburg, all of Ill.

[73] Assignee: Motorola, Inc., Schaumburg, Ill.

[21] Appl. No.: 222,423

[22] Filed: Jan. 5, 1981

[51] Int. Cl.³ .......................................... H04L 27/06
[52] U.S. Cl. ...................................... 375/94; 375/95; 328/109; 364/486; 364/575
[58] Field of Search ............... 328/108, 109, 119, 127; 329/104, 105; 324/76 A, 77 R, 111, 133; 343/103; 364/178, 486, 487, 575, 701, 734; 375/21, 75, 94, 95

[56] References Cited

U.S. PATENT DOCUMENTS

| | | | |
|---|---|---|---|
| 3,736,590 | 5/1973 | Lipsey et al. | 343/103 |
| 3,868,690 | 2/1975 | Miller | 343/103 |
| 3,868,691 | 2/1975 | Miller et al. | 343/103 |
| 3,925,732 | 12/1975 | Tanaka et al. | 375/94 |
| 4,164,036 | 8/1979 | Wax | 364/486 |
| 4,166,275 | 8/1979 | Michaels et al. | 343/103 |
| 4,292,593 | 9/1981 | de Jager et al. | 329/104 |

Primary Examiner—Benedict V. Safourek
Attorney, Agent, or Firm—Mark P. Kahler; Edward M. Roney; James W. Gillman

[57] ABSTRACT

The presence of a pulsed radio frequency signal is detected by periodically sampling such signal with first and second sampling strobes in quadrature relationship. The first and second strobes are separately accumulated for a first period of time overlapping a second period of time during which the first and second strobes are also accumulated. The four sums resulting from such accumulations are compared with a predetermined threshold level to determine the presence of the pulsed radio frequency signal.

6 Claims, 13 Drawing Figures

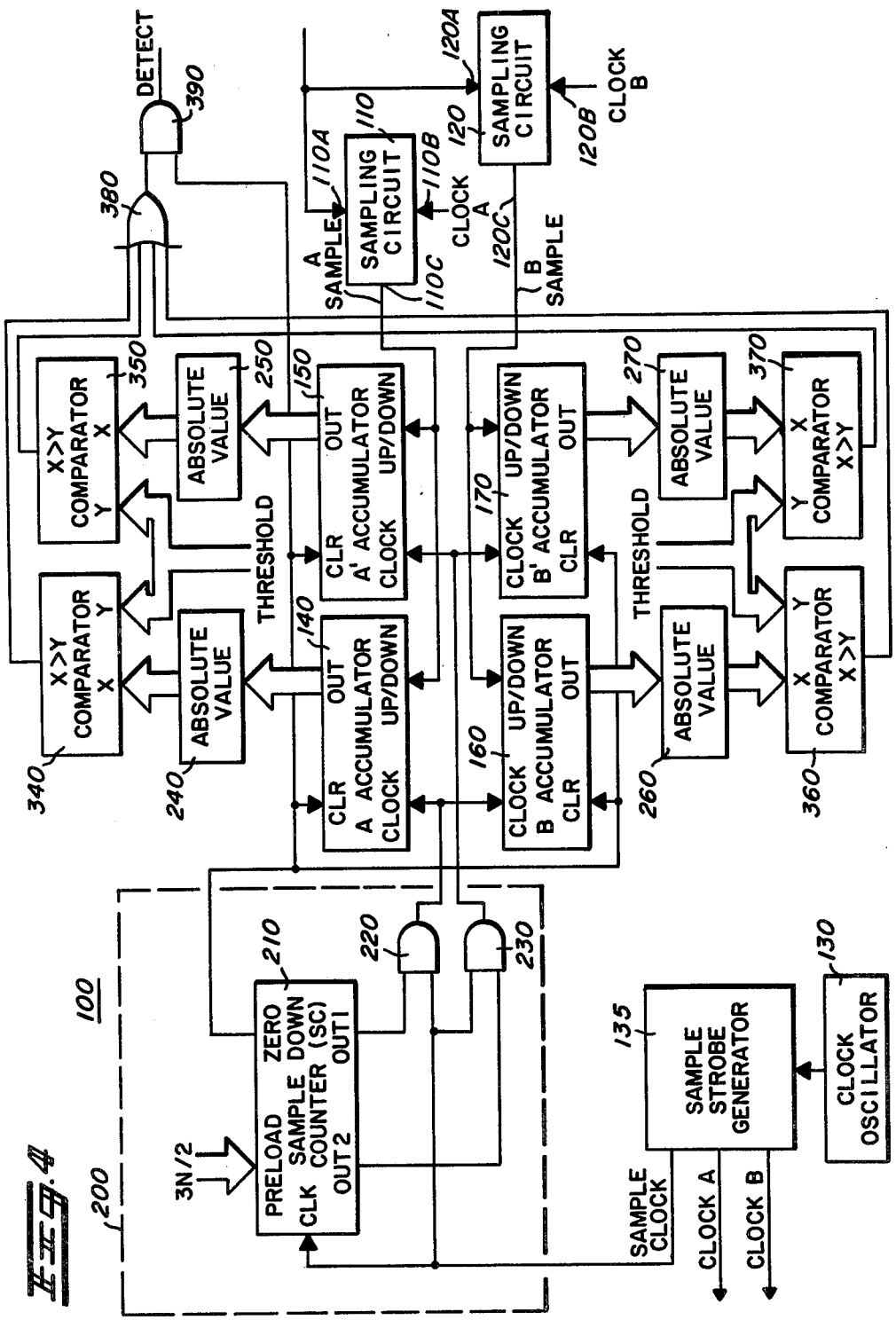

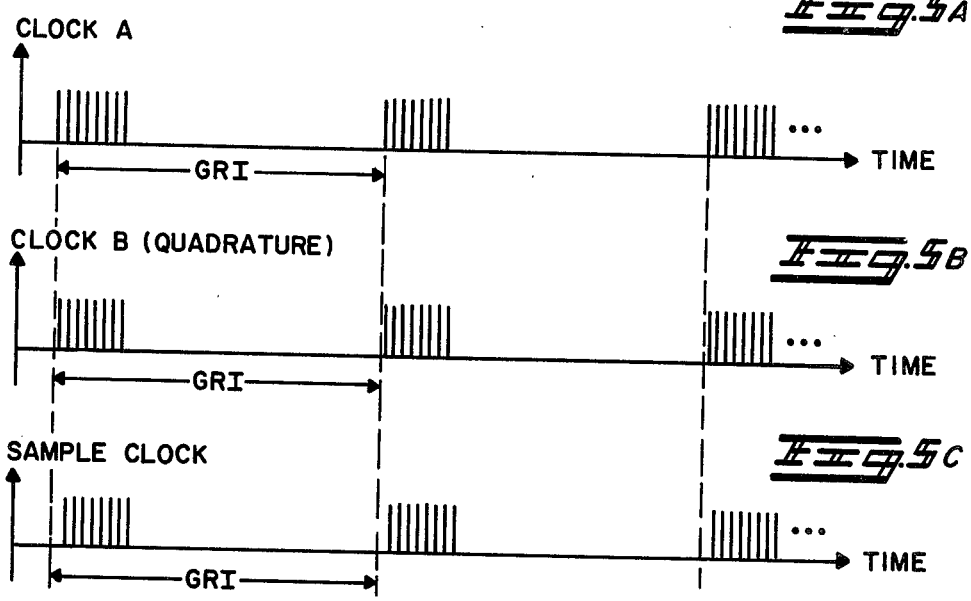
FIG. 5A
FIG. 5B
FIG. 5C
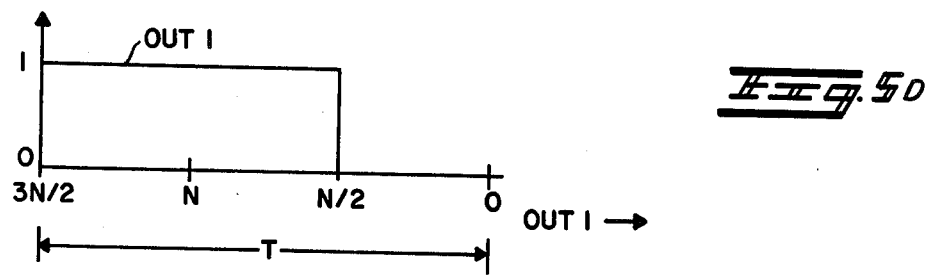
FIG. 5D
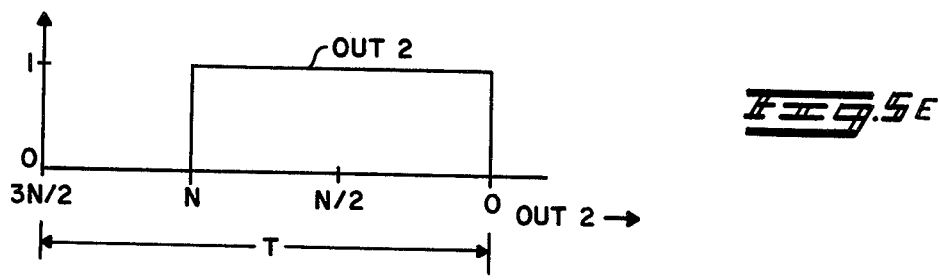
FIG. 5E

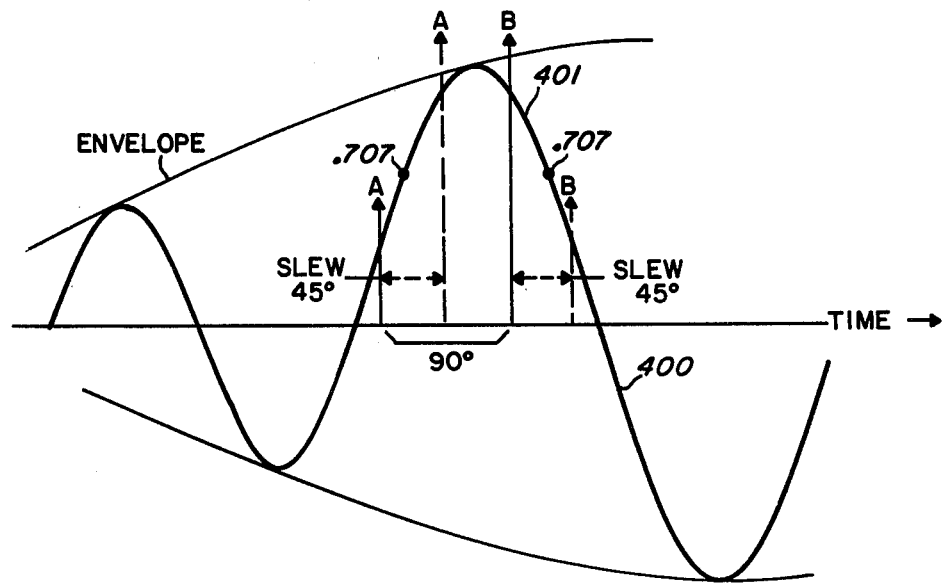

APPARATUS AND METHOD FOR DETECTING THE PRESENCE OF A PULSED RADIO FREQUENCY SIGNAL

BACKGROUND OF THE INVENTION

This invention relates generally to detecting the presence of a pulsed radio frequency signal, and more particularly to detecting the presence of a Loran C signal.

DESCRIPTION OF THE PRIOR ART

One system often employed for radionavigation purposes is the Loran C system. A typical Loran C chain of transmitting stations includes a master station and first and second secondary stations, each of which transmits a plurality of radio frequency pulses at preselected times relative to each other. As shown in FIG. 1, the master and first and second secondary stations each transmit a pulse group during a period of time designated the group repetition interval (GRI). More specifically, the master station first transmits a sequence of eight radio frequency pulses designated M and numbered 1 through 8, such pulses being generated at one millisecond intervals and being followed by a ninth pulse often employed for manual identification of the master station signal. The first secondary station generates a pulse group of eight radio frequency pulses designated $S_1$ a predetermined amount of time after pulse group transmission by the master station. A second secondary station transmits yet another pulse group of eight radio frequency pulses designated $S_2$ a predetermined amount of time after transmission of the $S_1$ pulse group. The times at which the master and first and second secondary station pulse groups are transmitted in each GRI are selected such that the times at which the pulse groups are received at the Loran C receiver do not overlap in time. This sequence of pulse group transmission first by the master station followed by the first and second secondary stations continues ad infinitum over successive GRI's. To determine the location of a Loran C receiving station, the time difference (TD) betwee the time of arrival of the first secondary station pulse groups and the master station pulse groups is determined and employed to plot a hyperbolic line of position on an appropriate map. The time difference between the time of arrival of the second secondary station pulse groups and the master station pulse groups at the Loracn C receiver is determined and used to plot a second hyperbolic line of position intersecting with the above first mentioned line of position thus yielding the location of the Loran C receiver.

FIG. 2 is a close up representation of some of the master pulses of FIG. 1. The envelope of the master station pulses is readily seen in this view.

In order to use the information contained in Loran C signals to determined location, it is apparent that the presence of the Loran C signal must first be determined. One conventional approach employs a reference oscillator or clock to control sampling of a received Loran C signal. For example, the reference oscillator causes a strobe generating apparatus to instruct a sampling circuit to take samples of the Loran C signal master pulses at a frequency as nearly equal to the frequency of the master pulses as possible. One sample is taken of each master pulse. In this approach, it is apparent that the frequency at which the master pulses are sampled must be precisely equal to the frequency of the master pulses; otherwise, the samples will not remain stationary near a peak or crest within each master pulse but will tend to wander or slew through the Loran C master pulses as the pulses of successive GRI's are sampled. A precision reference oscillator is typically required to achieve the accurate sampling required above. However, even employing perfectly stable reference clock oscillator does not assume that samples will always be taken near a peak or crest of the master pulses. Rather, even with such a stable oscillator some samples may be taken at or near master pulse zero crossings, thus yielding a false indication that a Loran C master pulse is not present. It is noted that the master pulses of several GRI's are typically sampled in order to determine the presence of a Loran C master signal or secondary signals. As the sensitivity requirements of such a pulse detecting apparatus become larger, that is, as the signal to noise ratio becomes smaller, an increasingly greater number of samples of the Loran C pulses must be taken. Thus, the number of GRI's during which Loran C samples are taken is increased to be commensurate with the particular signal to noise ratio desired. It is understood that in practice the presence of the master station pulses is customarily determined first by sampling such pulses in accordance with the above. After it is determined that master pulses are present, sampling of the first and second secondary station pulses is commenced.

In more detail, the presence of the master station pulses is determined by accumulating the samples of the suspected Loran C master pulses for a number of GRI's determined in accordance with the above. This accumulation generates a sum which is compared to a predetermined threshold level. If the sum exceeds this predetermined threshold level, a Loran C master pulse signal is deemed to be present. If the sum fails to exceed the threshold, a Loran C master pulse signal is not detected by employing the particular sampling times supplied via the reference clock oscillator. The sampling times supplied via the reference clock oscillator may be added to or subtracted from to generate new sampling times prior to continuing the search for Loran C pulse signals. This detection approach will detect the presence of some Loran C pulse signals; however, the likelihood is high that unless the reference clock oscillator is extremely stable, the above mentioned sample slewing problem will occur. For example, even if the clock oscillator causes an initial sample to be taken at a positive peak of a Loran C master pulse 10 such as peak 20 in FIG. 2, and more clearly in FIG. 3, after several GRI's, the oscillator may drift or slew sufficiently such that sampling no longer occurs at positive peak 20 but rather below the half power point 30 of peak 20 at a level sufficiently low to contaminate the samples with noise 40. Such contaminated samples may be falsely negative or positive. Thus, when accumulated, such samples tend to falsely indicate that a Loran C master pulse signal is not present. The difficulty caused by such oscillator slewing is readily appreciated. Another difficulty with this approach is that the sampling strobe may occur near a zero crossing rather than near a peak or crest of the Loran C master pulses. This occurrence falsely indicates that a Loran C master pulse signal is not present.

One commonly used approach for lessening the difficulties experienced in the approach described above is to sample each pulse of the received Loran C signal with a pair of sampling strobes having a quadrature relationship, that is, being spaced 90° ±J 180° (wherein J is an integer) apart in time. It is thus assured that at any particular point in time at least one of these two quadrature strobes is within ±45° from a positive or negative peak of the Loran C pulse waveform. Each of the quadrature sampling strobes are separately accumulated in two respective accumulators, one accumulator accumulating one strobe of the pair and the other accumulator accumulating the remaining quadrature strobe of the pair. The number of GRI's over which accumulation of the respective sampling strobes is conducted is selected such that during this period of time the strobes cannot slew more than 45° due to drifting of the reference clock oscillator. This two sample quadrature approach increases the probability of Loran C pulse detection by assuring that at least one of the two strobes is near a Loran C pulse peak or crest. Even with these benefits, the quadrature sampling approach still requires a highly stable oscillator, for example a 1pm oscillator, to assure relatively low signal to noise falsing.

Another object of the present invention is to provide apparatus for detecting the presence of a pulsed radio frequency signal which alleviates the difficulties experienced in the above described signal detection apparatus.

It is one object of the present invention to provide apparatus for detecting the presence of a pulsed radio frequency signal which is configured to permit employment of a reference clock oscillator having less stringent requirements than those in the above described signal detection apparatus while still maintaining a high detection probability.

These and other objects of the invention will become apparent to those skilled in the art upon consideration of the following description of the invention.

BRIEF SUMMARY OF THE INVENTION

The present invention is directed to providing an apparatus and method for detecting the presence of a pulsed radio frequency signal.

One embodiment of the invention includes a sampling circuit for periodically generating sampling strobes to sample said radio frequency signal during a selected period of time, T. A first accumulator is coupled to the sampling circuit to accumulate the sampling strobes during a first period of time less than T. A first sum is thus generated. A second accumulator is coupled to the sampling circuit to accumulate the sampling strobes during a second period of time less than T. A second sum is thus generated. The second period of time overlaps the first period of time. A comparator is coupled to the first and second accumulators for generating an output signal when one of the first and second sums exceeds a predetermined threshold level. An improved probability of signal detection results from such apparatus.

In accordance with another, and preferred embodiment of the invention, apparatus for detecting the presence of a pulsed radio frequency signal includes a sampling circuit for periodically generating first and second sampling strobes in quadrature relationship to sample the radio frequency signal during a selected period of time, T. First and second accumulators are coupled to the sampling circuit to respectively accumulate the first and second strobes during a first period of time less than T. First and second sums are thus respectively generated. Third and fourth accumulators are coupled to the sampling circuit to respectively accumulate the first and second strobes during a second period of time less than T. Third and fourth sums are thus respectively generated. The second period of time overlaps the first period of time. A comparator is coupled to the first, second, third and fourth accumulators to generate an output signal when any one of the first, second, third and fourth sums exceeds a predetermined threshold level. Such apparatus permits employment of a reference clock oscillator which has comparatively lower stability than those in the prior art approaches discussed above, while still maintaining and, in fact, improving Loran C pulse detection probability.

The features of the invention believed to be novel are set forth with particularity in the appended claims. The invention itself, however, both as to organization and method of operation, together with further objects and advantages thereof, may best be understood by reference to the following description taken in conjunction with the accompanying drawings.

DESCRIPTION OF THE DRAWINGS

FIG. 4 is a block diagram of apparatus in accordance with the present invention for detecting the presence of a pulsed radio frequency signal.

FIG. 5A is a graph showing groups of clock A strobes.

FIG. 5B is a graph showing groups of clock B strobes.

FIG. 5C is a graph showing groups of sample clock strobes.

FIG. 5D is a graph showing the times during which accumulators A and B are operative.

FIG. 5E is a graph showing the times during which accumulators A' and B' are operative.

FIG. 6A is a graph of a portion of a Loran C signal pulse shown sampled by quadrature sampling strobes in accordance with prior art techniques.

DETAILED DESCRIPTION OF THE PREFERRED EMBODIMENT

Figure 1:
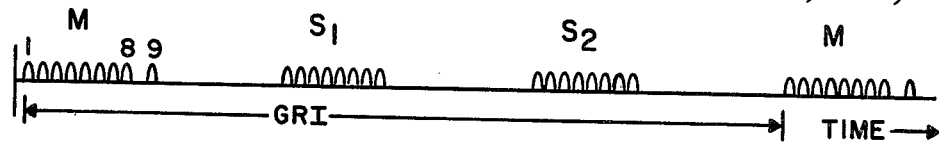
FIG. 1 is an amplitude versus time representation of the master, first secondary and second secondary station Loran C signals.
Figure 2:
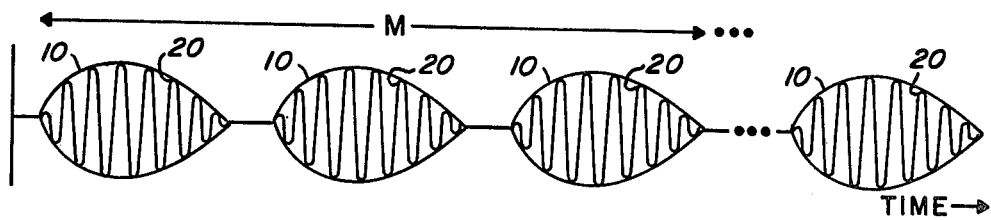
FIG. 2 is a close up representation of the envelopes of three typical master station pulses.
Figure 3:
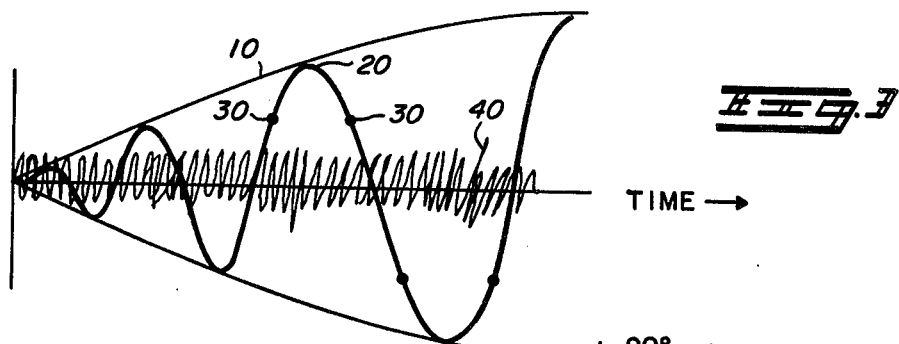
FIG. 3 shows a portion of a Loran C pulse having a noise component thereon.

FIG. 4 is a block diagram of apparatus for detecting the presence of a pulsed radio frequency signal, shown as detector 100, in accordance with the present invention. Detector 100 includes a reference clock oscillator 130 coupled via a sample strobe generator 135 to sampling circuits 110 and 120 to control the times at which sampling circuits 110 and 120 take samples of the received Loran C signal provided thereto. More specifically, the output of clock oscillator 130 is coupled to the input of sample strobe generator 135 to provide a time base or reference thereto. Strobe generator 135 generates the three output signals shown in FIGS. 5A, 5B, and 5C respectively at the CLOCK A, CLOCK B and SAMPLE CLOCK outputs thereof. The CLOCK A output signal comprises groups of eight sampling strobes per GRI. One strobe is generated during each Loran C master pulse and thus strobes are spaced apart in time by approximately 1 millisecond, the time spacing between master pulses. The CLOCK A signal is provided to CLOCK A input 110B of sampling circuit 110 (connection now shown) to instruct sampling circuit 110 when to sample the incoming Loran C signal. Samples designated A samples are thus generated at sampling circuit output 110C.

Figure 6B:
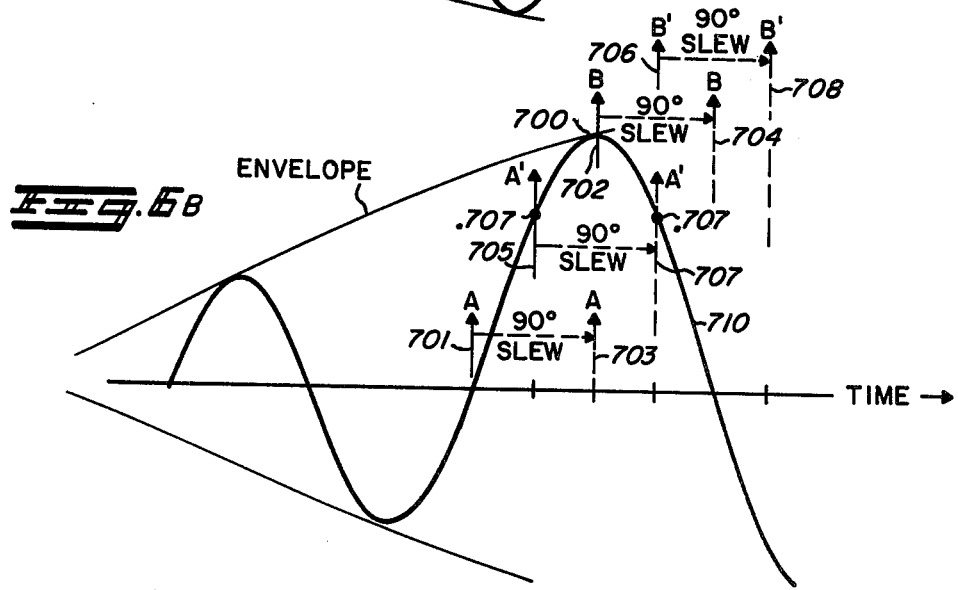
FIG. 6B is a graph of a portion of a Loran C signal pulse showing the time relationship of the four effective sampling strobes in accordance with their present invention.

The CLOCK B output signal of strobe generator 135 comprises 8 sampling strobes per GRI in a manner similar to the CLOCK A output signal discussed above, except each strobe of the CLOCK B output is delayed sufficiently in time with respect to the CLOCK A output signal such that each strobe of the CLOCK B signal exhibits a quadrature relationship with a corresponding strobe of the CLOCK A signal as seen in FIG. 5B. The CLOCK B output signal is provided to the CLOCK B input 120B of sampling circuit 120 (connection not shown) to instruct sampling circuit 120 when to sample the incoming Loran C signal. Samples designated B samples are thus generated at sampling circuit output 120C. The quadrature relationship of the A and B samples is readily seen in FIG. 6B which depicts typical A and B sampling strobes with respect to a peak or crest of a Loran C signal pulse. FIG. 6B will be discussed in detail later in this description.

Referring to FIG. 5C, the SAMPLE CLOCK output signal generated by sample strobe generator 135 is shown. The SAMPLE CLOCK signal comprises 8 strobes per GRI generated at the same frequency or rate as the CLOCK A and CLOCK B strobes, but commencing each GRI after the CLOCK B strobes commence as depicted in FIGS. 5B-5C and before the next group of CLOCK A strobes commences as seen in FIG. 5A. The SAMPLE CLOCK output signal will be discussed in more detail subsequently.

Sampling circuit output 110 C is coupled to the UP/DOWN inputs of accumulators 140 and 150 which respectively sum the A samples supplied thereto when so instructed by appropriate signals to the CLOCK inputs thereof in accordance with subsequent discussion. The B quadrature samples generated at sampling circuit output 120C are fed to the UP/DOWN inputs of each of accumulators 160 and 170. Accumulators 160 and 170 respectively sum the B quadrature samples provided thereto during selected times according to appropriate timing signals provided to the CLOCK inputs of accumulators 160 and 170 in accordance with subsequent discussion.

A timing circuit 200 is coupled to the CLOCK inputs of accumulators 140, 150, 160 and 170 to control the times, that is number of GRI's, during which such accumulators accumulate the A samples and the B quadrature samples. Before examining timing circuit 200 in detail, it is instructive to note the particular times during which different ones of accumulators 140 through 170 are instructed by timing circuit 200 to accumulate the samples provided to such accumulators. Timing circuit 100 instructs accumulators 140 and 160 to accumulate the A samples and B quadrature samples respectively provided thereto during 12 consecutive GRI's, that is, from a first GRI, a second GRI and so forth through a twelfth GRI in this embodiment. After accumulators 140 and 160 have accumulated the A and B samples during the first six GRI, timing circuit 200 instructs accumulators 150 and 170 to respectively commence accumulating the A and B samples respectively provided thereto from the seventh GRI through an eighteenth GRI in this embodiment. Although the samples provided to accumulators 150 and 170 are actually the same A samples and B quadrature samples, provided to accumulators 140 and 160, such samples provided to accumulators 150 and 170 during the seventh through eighteenth GRI are designated A' samples and B' quadrature samples respectively. Timing circuit 200 instructs accumulators 140 and 160 to cease accumulating A samples and B quadrature samples respectively after samples up to the twelfth GRI have been accumulated. Timing circuit 200 instructs accumulators 150 and 170 to cease accumulation and reset to zero after each eighteen GRI. Timing circuit 100 instructs accumulators 140 and 160 to reset to zero after each eighteen GRI. It is seen that the accumulation process in accumulators 140 and 160 for the A and B quadrature samples overlaps the accumulation process in accumulators 150 and 170 for the A' and B' quadrature samples during the seventh through twelfth GRI's in this embodiment. T is defined to be the total amount of time including overlap during which accumulators 140 through 170 accumulate before being zeroed. Here T equals eighteen GRI for example. Other values for T and amount of overlap may be employed as per subsequent discussion.

Timing circuit 200 includes a down counter 210 having PRELOAD and CLOCK inputs, and ZERO and first and second outputs designated OUT 1 and OUT 2 as shown in FIG. 4. The reference clock oscillator 130 for which slewing compensation is desired is coupled to the CLOCK input of counter 210 via sample strobe generator 135 to control the rate at which counter 210 counts down. The SAMPLE CLOCK output of sample strobe generator 135 is coupled to the CLOCK input of counter 210. Thus the 8 pulse/GRI SAMPLE CLOCK signal shown in FIG. 5C is fed to the CLOCK input of counter 210 to instruct counter 210 to decrement by one per each master pulse. A number 3N/2 is provided to the PRELOAD input of counter 210 to provide an initial number at which counter 210 commences counting down or decrementing. N is defined to be the total number of samples to be accumulated in each of accumulators 140 through 170. For example in the present embodiment, accumulators 140 through 170 each accumulate samples during twelve GRI. Eight significant master pulses occur during each GRI (excluding the ninth pulse for simplicity) one sample per accumulator pair (pair 140-150, pair 160-170) being provided for each master pulse. Thus, in this example N=96 samples (8 samples per GRI×12 GRI).

Counter 210 generates the waveform shown in FIGS. 5D and 5E at the respective OUT 1 and OUT 2 outputs thereof. More specifically, the OUT 1 output generates a logical 1 as counter 210 counts down from 3N/2 to N/2, that is the first $\frac{2}{3}$ of the time interval T. A logical zero is generated at OUT 1 is counter 210 counts down from N/2 to zero, that is the remaining $\frac{1}{3}$ of the time interval T. The OUT 1 output of counter 210 and the SAMPLE CLOCK output of sample strobe generator 135 are coupled to respective inputs of a 2 input AND gate 220, the output of which is coupled to the CLOCK inputs of accumulator 140 (accumulates A samples) and accumulator 160 (accumulates B quadrature samples). Thus, accumulators 140 and 160 are respectively instructed to accumulate A samples and B quadrature samples during the first $\frac{2}{3}$ of the time interval T, that is, during the first 12 of the 18 GRI's comprising interval T in this embodiment or, expressed alternatively, during the time counter 210 counts down from 3N/2 to N/2 at the OUT 1 output thereof.

Down counter 210 generates a logical zero at the OUT 2 output thereof as counter 210 counts down from 3N/2 to N, that is, during the first six GRIs in this embodiment or the first ⅓ of the time interval T. Counter 210 generates a logical 1 at the OUT 2 output thereof as counter 210 counts down from N to zero. Counter 210 output OUT 2 and the SAMPLE CLOCK output of sample strobe generator 135 are coupled to respective inputs of a two input AND gate 230, the output of which is coupled to the CLOCK inputs of accumulator 150 (accumulates A' samples) and accumulator 170 (accumulates B' quadrature samples). Timing circuit 200 thus causes accumulators 150 and 170 to respectively accumulate the A samples (now designated A' samples) and the B quadrature samples (now designated B' quadrature samples) provided thereto during the last ⅔ of the time interval T, that is from the seventh GRI through the eighteenth GRI in this embodiment during which downcounter 210 counts down from N to zero at the OUT 2 output thereof.

The outputs of accumulators 140, 150, 160 and 170 (designated OUT) are coupled to the inputs of respective absolute value circuits 240, 250, 260 and 270. Absolute value circuits 240 through 270 assure that the accumulated sums provided thereto by respective accumulators 140 through 170 exhibit a positive polarity at the outputs of absolute value circuits 240 through 270. The outputs of absolute value circuits 240 through 270 are coupled to respective inputs designated X of four 2-input comparators 340, 350, 360 and 370 as shown in FIG. 4. Comparators 340 through 370 each include an input designated X and a threshold input designated Y. Comparators 340 through 370 each generate an output signal at the respective outputs thereof designated Y whenever the accumulated sample sum provided thereto exceeds a predetermined threshold level exhibited by a threshold signal provided to the Y inputs of comparators 340 through 370. In this embodiment wherein N=96 samples, an appropriate threshold level supplied to the Y inputs of comparators 340 through 370 corresponds to an effective relative value of 52. Thus, whenever the accumulated sample sum provided to one of comparators 340 through 370 exceeds the threshold 52 in this embodiment, the same comparator produces a logic signal at its output. The outputs of comparators 340 through 370 are coupled to respective inputs of a four input OR gate 380 such that whenever one of comparators 340 through 370 generates an output signal, OR gate 380 generates an output signal indicating that a Loran C signal has been detected by detector 100.

The ZERO output of down counter 210 is coupled to the clear inputs (CLR of accumulators 140 through 170 and to one input of a two input AND gate 390, the remaining input of which is coupled to the output of OR gate 380. This assures that the presence of a Loran C signal will be tested for during each period of time T. That is, after downcounter 210 counts down from 3N/2 to 0 signifying the occurrence of eighteen GRI's, accumulators 140 through 170 are cleared and are ready to accumulate samples over the next time period T. The presence of a Loran C signal is again tested for and so forth odd ad infinitum. The connection of the ZERO output of counter 210 to AND gate 390 conveniently causes gate 390 to output a detect or no detect output signal once per period of time T, that is, after each time counter 210 has counted down from 3N/2 to 0.

To better understand an important aspect of the present invention it is helpful to examine the slewing characteristics exhibited by the reference oscillator employed in the two sampling strobe quadrature Loran C signal detection technique discussed briefly in the description of the prior art. It will be recalled that in that approach, two sampling strobes in quadrature relationship, designated A and B, were employed to sample each pulse of a Loran C signal. In such an arrangement the maximum allowable slew of the reference oscillator which controls the timing of the strobes is typically 45°. FIG. 6A shows part of a Loran C pulse 400 including a peak which is sampled by the A and B sampling strobes. The vertical arrows shown in solid lines indicate the first A and B sampling strobes generated by a reference oscillator controlled strobe generating apparatus with respect to angular position on a typical Loran C pulse peak 401, while the vertical arrows shown as dotted lines illustrate the angular position of the A and B sampling strobes relative to the same Loran C signal pulse peak occurring several GRI's later. It is noted that in this prior art approach, during a single accumulation of Loran C samples, the typical maximum allowable slew or drift is 45° from the start of sampling and accumulation to the end of sampling and accumulation. To accurately accumulate or integrate the Loran C signal A and B samples over several pulses and several GRI's, it is desirable that at least one of such A and B samples occurs near the crest of the particular peak sampled or, more specifically, above the point 0.707 half power point of such peak. Should this not occur, that is, if at least one of the two A and B samples does not consistently occur above the half power point, such samples below the half power point may be degraded by noise thus resulting in signal falsing upon accumulation or integration of the A and B signal samples. To summarize, in this prior art approach it is likely that one of the two A and B samples will be undesirably below the 0.707 half power point, and due to noise result in accumulation or integration errors thus causing inaccurate detection of the Loran C signal and lower detection probabilities.

The potential slewing action of the four sampling strobes A, B, A' and B' employed in the present invention is shown in FIG. 6B. It is noted that the maximum permissible slew or drift of the sampling strobes employed in the present invention is 90° as shown in FIG. 6B. Thus, a reference clock oscillator 130 having twice as much slew as the one described immediately above may be employed to control the timing of the strobes generated in detector 100. More specifically, in an application that would require a reference oscillator with a 1 ppm. stability under the prior art approach above, a reference oscillator having a 2 ppm. stability may be employed in the detector of the present invention while nevertheless achieving an increase in the probability of detecting the presence of a Loran C signal. FIG. 6B shows sampling strobes A and B as solid vertical arrow-like lines 701 and 702 relative to a peak 700 of a Loran C signal pulse 710 when such sampling is initiated, while dotted vertical arrow-like lines, designated A (703) and B (704), show such strobes several GRI's (namely twelve) after such strobes have slewed or drifted 90° for example. The A' and B' strobes are shown as vertical solid arrow-like lines designated A' (705) and B' (706). Such A' and B' strobes are shown commencing in this example after the A and B strobes have slewed 45° corresponding to the A' and B' strobes commencing after six GRI of a T=18 GRI time period have transpired. Vertical dotted arrow-like lines labeled A' (707) and B' (708) designate the A' and B' strobes after such strobes have slewed 90° during the course of sampling 18 GRI. It is noted again that the A' and B' strobes are in practice the A and B strobes now offset in time by the amount of slew or drift which has occurred before the time accumulation of the A' and B' strobes commences after the first six GRI or the first one-third T time period. It is noted that in detector 100 of the present invention at least one of the four sampling strobes A, B, A' and B' occurs near the crest of a Loran C signal peak between the half power points (0.707) such that despite as much as 90° slew during accumulation, at least one of the four accumulators 140 through 170 will accumulate samples corresponding to times near the pulse crest between the half power points thus assuring the detection of a Loran C signal to a substantially high probability when present.

Figure 7A:
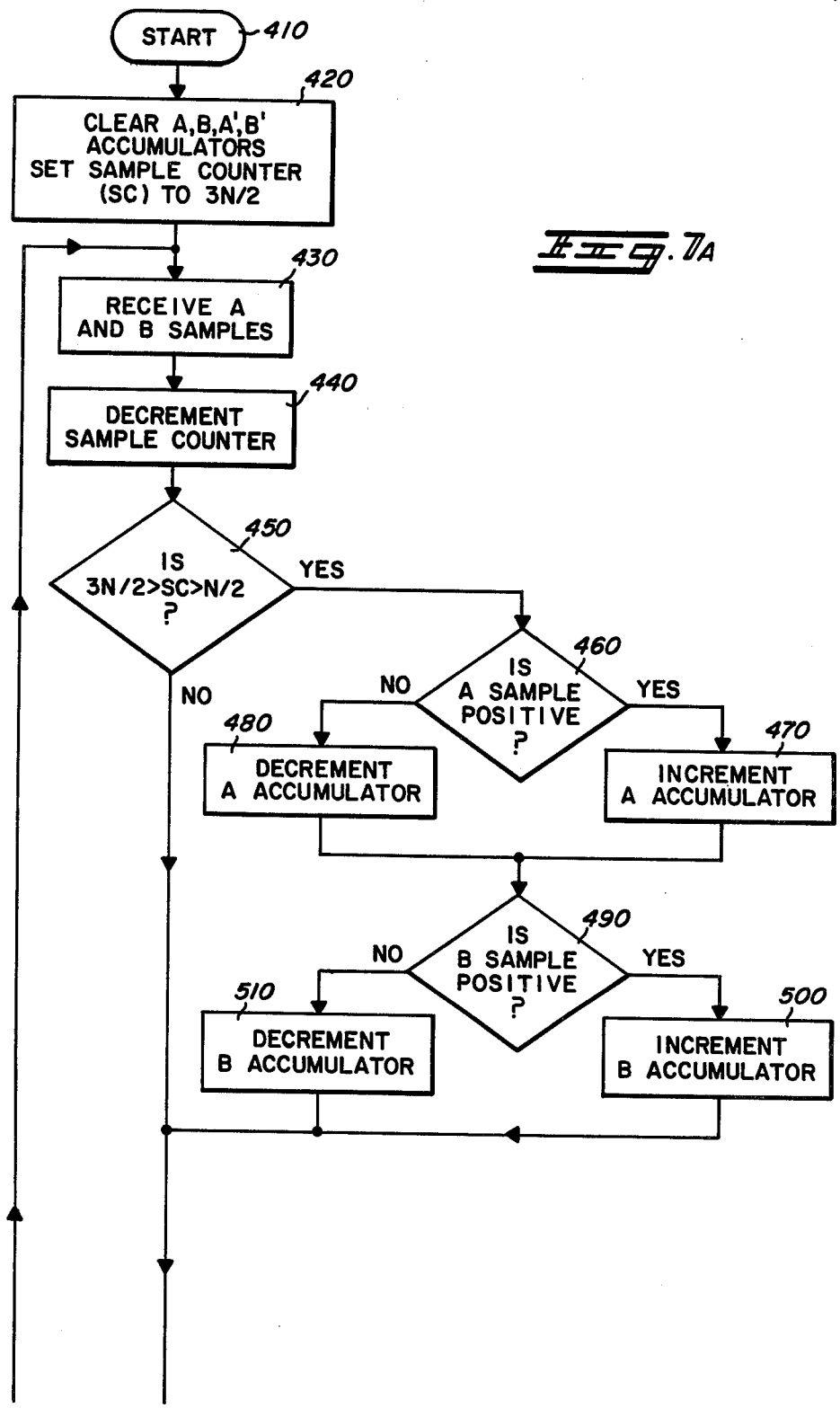
FIG. 7 is a flow chart illustrating the method of the present invention.
Figure 7B:
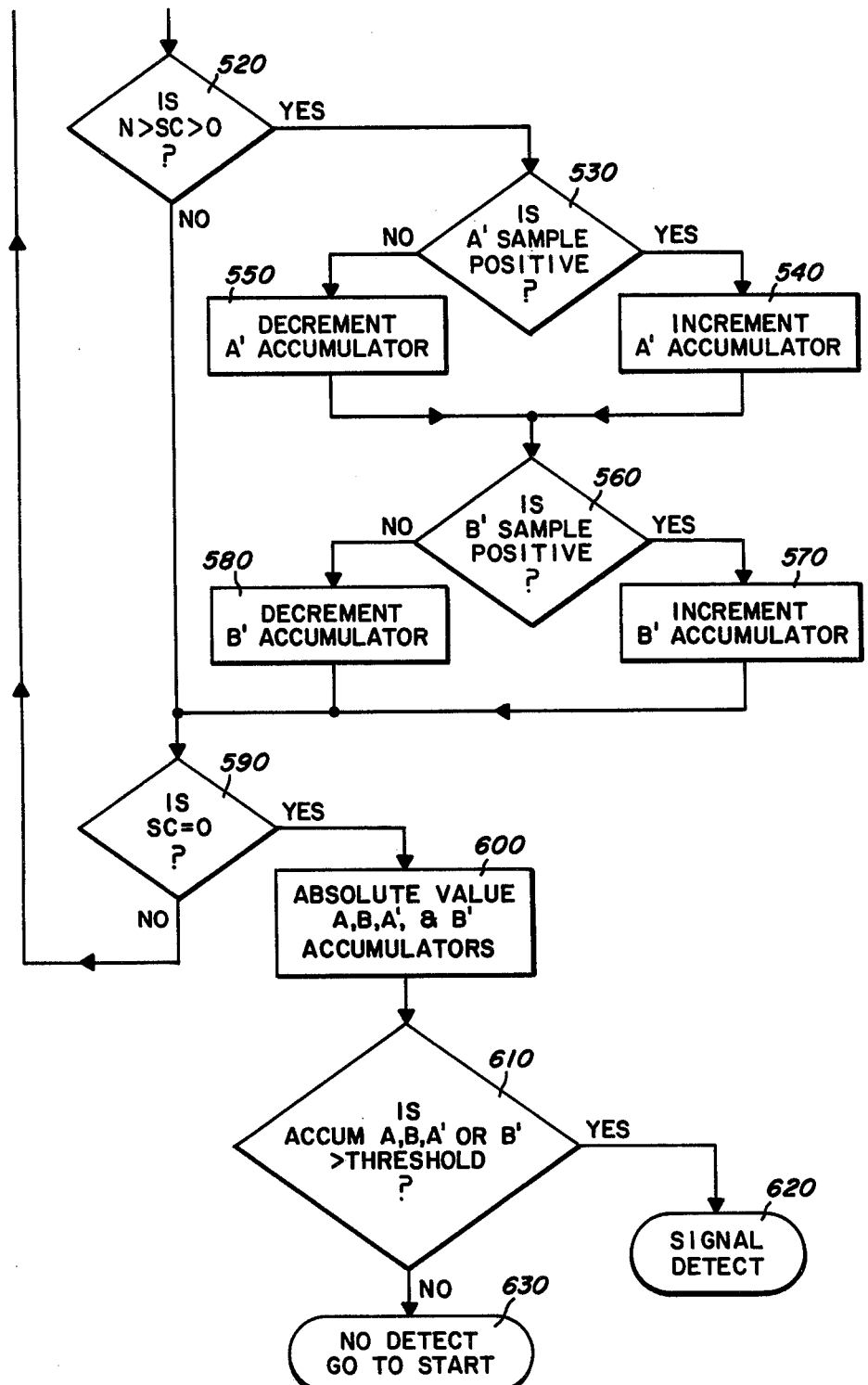

To facilitate a better understanding of the Loran C signal detector 100 shown in FIG. 4, a flow chart showing the operation of detector 100 is shown in FIG. 7. Operation is initialized at the start step at 410. To enable signal detection during a time interval T of 18 GRI, for example, accumulators A, B, A' and B' (namely accumulators 140, 160, 150 and 170, respectively) are cleared and a number of samples 3N/2 (here corresponding to the number of samples desired during 18 GRI) is provided to the PRELOAD input of counter 210 and is designated SC (sample count) as in step 420. Sample A and quadrature sample B are taken by sampling circuits 110 and 120, respectively as per step 430. After the A sample and the B quadrature samples are taken, the preloaded quantity SC is decremented by one as per step 440. A test is conducted to determine if the SC is less than 3N/2 and greater than N/2 as shown in decision block 450 to determine if the present A sample and B quadrature sample are those occurring during the first twelve GRI (that is, the first two-thirds T) in this embodiment for which accumulation in accumulators A and B (140 and 160 respectively) is desired. If SC is between the just mentioned parameters, a further test is conducted to determine if the A sample is positive as per decision block 460. If the subject A sample is positive the A sample accumulator 140 is incremented by 1 as per step 470. If the subject A sample is negative, A sample accumulator 140 is decremented by one as per block 480. The subject B sample is likewise tested for polarity in step 490. If the subject B sample is positive, B accumulator 160 is incremented by 1 as per block 500 whereas if the subject sample B is negative, B accumulator 160 is decremented by 1 as per block 510.

If the sample count SC is not determined to be between 3N/2 and N/2 in step 450, a decision step 520 is immediately executed to determine if SC is between N and 0. That is, step 520 determines if the subject incoming A sample and B quadrature sample are taken during the last 12 GRI (in this embodiment), that is during the last two-thirds of the selected sampling time period T. It is noted that after steps 500 and 510 are conducted, decision step 520 is commenced as well as when directly mandated in the step 450 decision discussed above. If decision step 520 finds SC to be between N and 0, decision step 530 determines the polarity of the subject A sample. If the subject A sample is positive A' accumulator 150 is incremented by 1 as per step 540 whereas if the subject A sample is negative, A' accumulator 150 is decremented by 1 as per step 550. The polarity of the subject B sample is then determined in step 560. If the polarity of the subject B sample is positive, B' accumulator 170 is incremented by 1 as per step 570, whereas if the polarity of the subject B sample is negative, the B' accumulator 170 is decremented by 1 as per step 580. A test 590 is then conducted to determine if SC=0, that is to determine if the particular time period T for which Loran C signal detection is desired has ended. This test is also conducted after the decision step 520 if SC is not between N and 0. If decision step 590 determines that SC does not equal 0, detector 100 proceeds to step 430 and takes the next A and B samples. If in decision step 590 it is determined that SC=0, then the particular sampling period T has ended and detector 100 proceeds to take the absolute value of the accumulated sums in accumulators 140 through 170 as per step 600. A test 610 is conducted to determine if the absolute value of any one of the accumulated sums of the four accumulators A, B, A' or B' is greater than a predetermined threshold level as per step 610. If one of the absolute values of these four accumulated sums is greater than such predetermined threshold, a Loran C signal has been detected and is indicated in step 620. However, if none of the absolute values of the four accumulated sums exceeds the predetermined threshold level, no Loran C signal is detected and detector 100 proceeds to start step 410 as per GO TO START step 630.

To briefly summarize, the method of the present invention for detecting the presence of a pulsed radio frequency signal includes periodically sampling such radio frequency signal with first and second sampling strobes in quadrature relationship during a selected prior of time, T. Such first and second strobes are separately accumulated during a first period of time less than T to respectively generate first and second sums. The first and second sums are separately accumulated during a second period of time less than T to respectively generate third and fourth sums. The second period of time overlaps the first period of time. The first, second, third and fourth sums are compared with a predetermined threshold level. An output signal is generated when any one of such sums exceeds the threshold level. In one preferred embodiment of the invention, the first period of time equals two-thirds T and the second period of time equals two-thirds T, such first and second periods of time overlapping by a period of one-third T. It is, however, understood that the invention may include other embodiments which exhibit more or less overlap of the first and second time periods, provided that each of the first and second time periods is sufficiently long to result in a high probability of detection for a received Loran C signal.

The foregoing described apparatus and method for detecting the presence of a pulsed radio frequency signal. The present invention permits employment of a reference clock oscillator having slewing specification readily obtainable at relatively low cost.

While only certain preferred features of the invention have been shown by way of illustration, many modifications and changes will occur to those skilled in the art. It is, therefore, to be understood that the present claims are intended to cover all such modifications and changes as fall within the true spirit of the invention.

We claim:
1. Apparatus for detecting the presence of a pulsed radio frequency signal including:
   sampling means for sampling said radio frequency signal during selected periods of time having duration T, to periodically generate first and second samples in quadrature relationship;

first and second accumulating means, coupled to said sampling means, for respectively accumulating said first and second samples during a first period of time less than T to respectively generate first and second sums;

third and fourth accumulating means, coupled to said sampling means, for respectively accumulating said first and second samples during a second period of time less than T to respectively generate third and fourth sums, said second period of time overlapping said first period of time, and comparator means, coupled to said first, second, third and fourth accumulating means, for generating an output signal when any one of said first, second, third and fourth sums exceeds a predetermined threshold level.

2. The apparatus of claim 1 wherein said first period of time equals two-thirds T.

3. The apparatus of claim 2 wherein said second period of time equals two-thirds T.

4. A method for detecting the presence of a pulsed radio frequency signal including the steps of:

periodically sampling said radio frequency signal to generate first and second samples in quadrature relationship during a selected period of time, T;

separately accumulating said first and second samples during a first period of time less than T to respectively generate first and second sums;

separately accumulating said first and second samples during a second period of time less than T to respectively generate third and fourth sums, said second period of time overlapping said first period of time, and comparing said first, second, third and fourth sums to a predetermined threshold level such that an output signal is generated when any one of said sum exceeds said threshold level.

5. The method of claim 4 wherein said first period of time equals two-thirds T.

6. The method of claim 5 wherein said second period of time equals two-thirds T.

* * * * *